US012723652B1

(12) United States Patent
Pierce

(10) Patent No.: US 12,723,652 B1
(45) Date of Patent: Sep. 1, 2026

(54) POWER FLOW TRANSMISSION

(71) Applicant: Thomas Pierce, Las Vegas, NV (US)

(72) Inventor: Thomas Pierce, Las Vegas, NV (US)

( * ) Notice: Subject to any disclaimer, the term of this patent is extended or adjusted under 35 U.S.C. 154(b) by 0 days.

(21) Appl. No.: 19/293,449

(22) Filed: Aug. 7, 2025

Related U.S. Application Data

(60) Provisional application No. 63/681,562, filed on Aug. 9, 2024.

(51) Int. Cl.
*F16H 63/16* (2006.01)
*F16H 45/02* (2006.01)
*F16H 57/023* (2012.01)

(52) U.S. Cl.
CPC ........... *F16H 63/16* (2013.01); *F16H 57/023* (2013.01); *F16H 2045/0284* (2013.01)

(58) Field of Classification Search
CPC ..... F16H 2003/0818; F16H 2003/0822; F16H 2003/008; F16H 3/16; F16H 47/06
See application file for complete search history.

(56) References Cited

U.S. PATENT DOCUMENTS 4,216,852 A 8/1980 Ushijima
2003/0136209 A1* 7/2003 Huber .................... F16H 3/093 74/331
2009/0215567 A1 8/2009 Iwasaki et al.
2014/0157766 A1 6/2014 Baraga et al.
2014/0371027 A1 12/2014 Goleski et al.
2016/0084352 A1* 3/2016 Regenscheit ........... F16H 3/093 74/331
2018/0298991 A1 10/2018 Mayhew
2020/0208738 A1 7/2020 Kim et al.
2020/0378478 A1* 12/2020 Kim ...................... F16H 37/042
2021/0164542 A1 6/2021 Zampieri et al.
2023/0184299 A1 6/2023 Damm et al.

* cited by examiner

*Primary Examiner* — Huan Le
(74) *Attorney, Agent, or Firm* — Cramer Patent & Design, PLLC.; Aaron R. Cramer

(57) ABSTRACT

An automatic transmission providing enhanced shifting is disclosed. A circular plate is mechanically coupled to a hydraulic pump and a turbine shaft and supports multiple clutch spindles and a thrust washer. Five multi-plate clutches, including low, intermediate, overdrive, reverse and high clutches, are mounted on the circular plate, which transfers power from the turbine shaft to the clutches via a high clutch drum. A preload plate with bolt holes supports a set of main shaft gears and countershafts in constant mesh and provides end-play adjustment with preload caps. The arrangement enables self-shifting operation without operator intervention, eliminating planetary gear sets and synchronizers to provide smoother shifting, reduced part count and simplified manufacture for vehicles and machinery.

9 Claims, 9 Drawing Sheets

POWER FLOW TRANSMISSION

RELATED APPLICATIONS

The present device was first described in and is a continuation of U.S. Provisional Application No. 63/681,562, filed Aug. 9, 2024, the entire disclosures of which are incorporated herein by reference.

FIELD OF THE DEVICE

The present invention relates generally to multi-speed automatic transmissions and, more particularly, to an automatic transmission with enhanced shifting means that enables self-shifting operation through a series of mechanically coordinated clutches and countershafts, without the use of planetary gear sets or synchronizers.

BACKGROUND OF THE DEVICE

Traditional automatic transmissions often rely on complex planetary gear arrangements, synchronizers, brake bands, and servos to facilitate gear changes. These systems tend to increase manufacturing complexity, cost, and maintenance requirements while also limiting responsiveness and shift smoothness. There remains a need for an automatic transmission that provides smoother gear changes, reduces the number of components, and simplifies assembly and repair without sacrificing functionality. The disclosed transmission addresses these shortcomings by implementing a direct-drive clutch-based configuration with constant-mesh gearing.

SUMMARY OF THE DEVICE

The present device is an automatic transmission with enhanced shifting means that utilizes a clutch-based system to deliver multiple forward and reverse speeds. The system comprises a hydraulic pump, turbine shaft, a circular plate supporting multiple clutches and spindles, and a preload plate supporting constant-mesh gear assemblies. Power from the turbine shaft is transferred to a main shaft through high, low, intermediate, overdrive, and reverse clutches, each coupled to corresponding countershafts and gears. The arrangement enables smooth, sequential shifting without operator intervention and eliminates the need for planetary gears or synchronizers. The design allows for modular construction, simplified maintenance, and improved reliability across a variety of applications, including vehicles and mechanical equipment.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
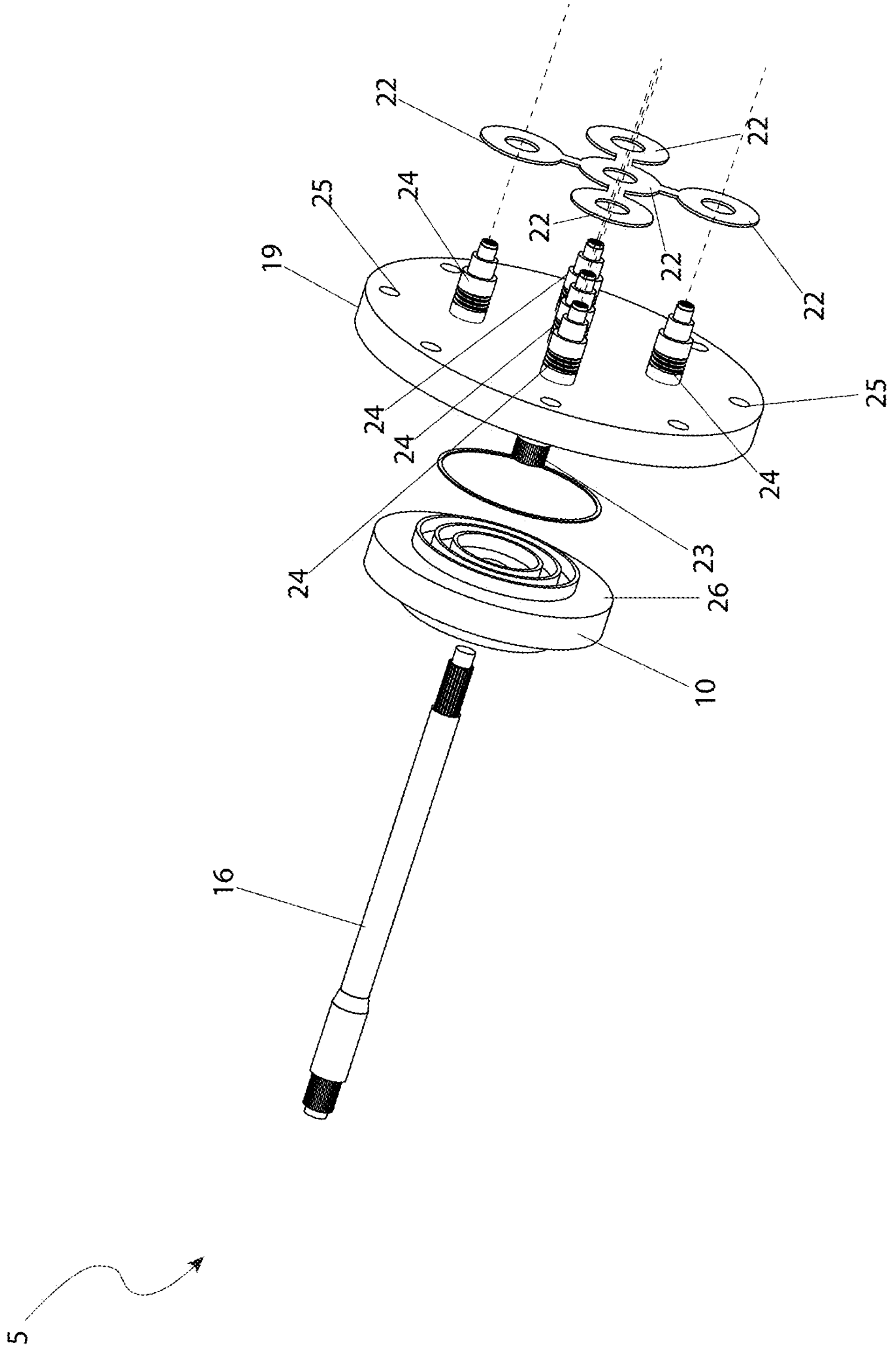
FIG. 1 is an exploded perspective view of a circular plate 19 in relationship with the hydraulic pump 10, as a function of the automatic transmission with enhanced shifting means 5, according to the preferred embodiment of the present invention.

5 automatic transmission
10 hydraulic pump
11 main shaft
12 low speed main shaft gear

13 intermediate speed main shaft gear
14 overdrive speed main shaft gear
15 rear housing plate
16 turbine shaft
17 drive coupling
18 clutch drum gear
19 circular plate
20 preload plate
21 preload plate bolt hole
22 thrust washer
23 stator support
24 clutch spindle
25 bolt hole
26 perimeter hole
27 preload cap
28 bearing cone
29 bearing cup
30 low speed/reverse countershaft
31 low speed countershaft gear
33 low clutch
34 low clutch drum
35 low clutch hub
36 low clutch piston assembly
40 intermediate countershaft
41 intermediate speed counter shaft gear
43 intermediate clutch
44 intermediate clutch drum
45 intermediate clutch hub
46 intermediate clutch piston assembly
50 overdrive speed countershaft
51 overdrive speed countershaft gear
53 overdrive clutch
54 overdrive clutch drum
55 overdrive clutch hub
56 overdrive clutch piston assembly
60 reverse drive gear shaft
61 reverse drive gear
62 reverse idler gear
63 reverse clutch
64 reverse clutch drum
65 reverse clutch hub
66 reverse clutch piston assembly
70 high clutch
76 high clutch drum
77 high clutch hub
78 high clutch piston

DESCRIPTION OF THE INVENTION

The best mode for carrying out the invention is presented in terms of its preferred embodiment, herein depicted within FIGS. 1 through 14. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, an exploded perspective view of the circular plate 19 in relationship with the hydraulic pump 10, as a function of the automatic transmission with enhanced shifting means 5, according to the preferred embodiment of the present invention is disclosed. The hydraulic pump 10 provides for a transmission that allows for the self-shifting of the speeds offered without the need of a clutch or interaction on behalf of the operator to progress through the speeds once the transmission is placed in drive or reverse. The automatic transmission with enhanced shifting means 5 uses the circular plate 19 which is in mechanical communication with a hydraulic pump 10 and a turbine shaft 16. The circular plate 19 also supports a plurality of clutch spindles 24 along with a thrust washer 22. The hydraulic pump 10 is provided with perimeter holes 26 which mate with the circular plate 19. Multiple bolt holes 25 are provided on the circular plate 19. A thrust washer 22 is also shown and will be described in greater detail herein below. The turbine shaft 16 is an input component that supplies rotation and torque from the turbine inside the torque converter to the automatic transmission with enhanced shifting means 5. The hydraulic pump 10 provides for the circulation of the transmission fluid under pressure to operate the clutches torque converter, lubrication of all mechanical and frictional components and transmission oil cooler circulation for fluid cooling during operation of the automatic transmission with enhanced shifting means 5. The stator support 23 is a machined part of the circular plate 19.

The circular plate 19 supports the five (5) clutches (low clutch 33, intermediate clutch 43, overdrive clutch 53, reverse clutch 63, and high clutch 70) and the hydraulic pump 10 so that the turbine shaft 16 running through the center of the circular plate 19 transfers power via the high clutch drum 76 to the other four (4) clutch drums ((low clutch drum 34, intermediate clutch drum 44, overdrive clutch drum 54, and reverse clutch drum 64). The bolt holes 25 (total of eight (8)) are drilled and counterbored during the manufacture of the circular plate 19 and provides for the attachment of the circular plate 19 to the clutch housing using fasteners. The clutch spindles 24 are machined parts of the circular plate 19. The thrust washer 22 adjusts for play or thrust for the clutch drums (low clutch drum 34, intermediate clutch drum 44, overdrive clutch drum 54, reverse clutch drum 64, and high clutch drum 76).

Figure 2:
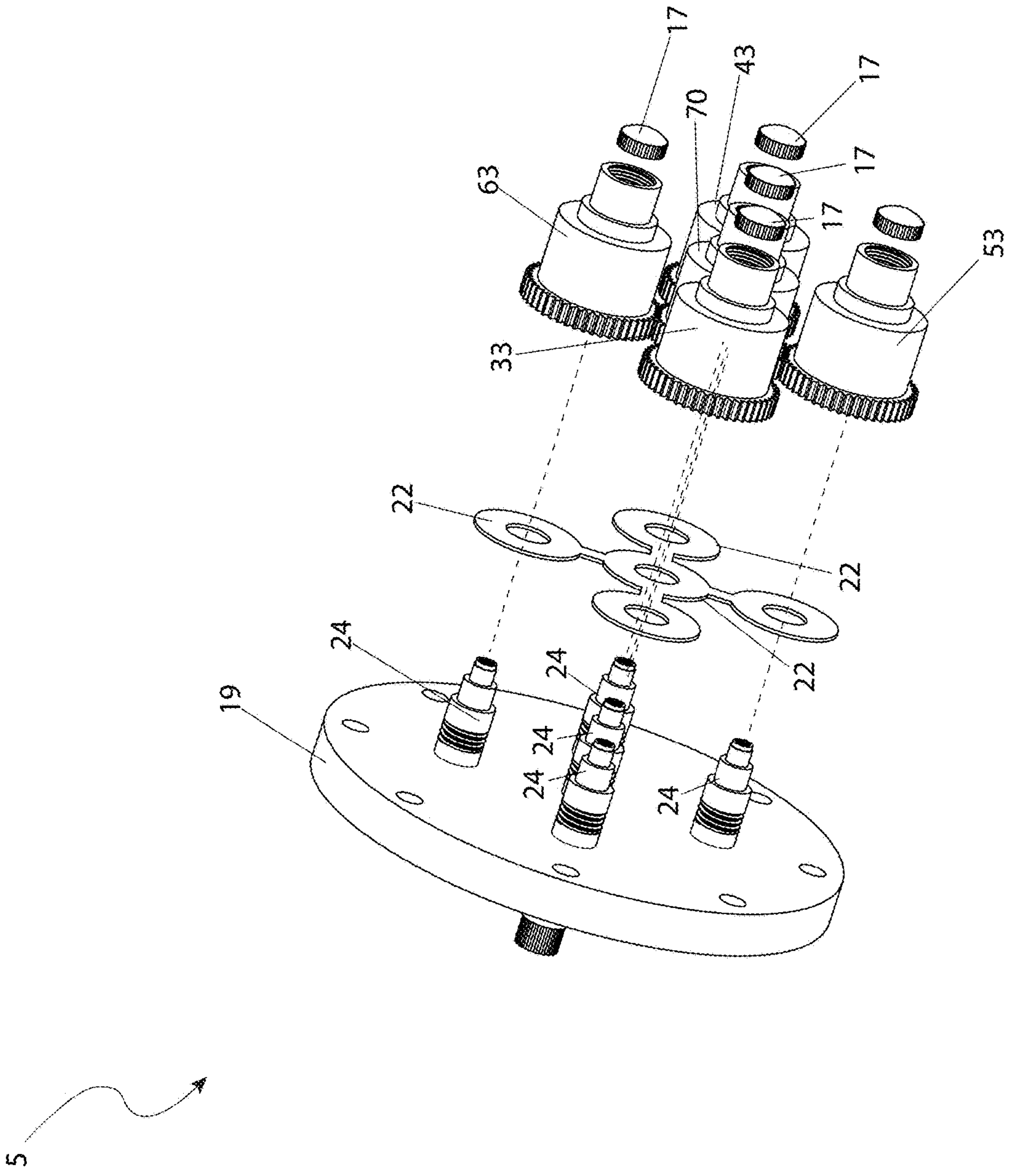
FIG. 2 is an exploded perspective view of the circular plate 19 as used with various clutches associated with the operation of the automatic transmission with enhanced shifting means 5, according to the preferred embodiment of the present invention.

Referring next to FIG. 2, an exploded perspective view of the circular plate 19, as used with various clutches associated with the operation of the automatic transmission with enhanced shifting means 5, according to the preferred embodiment of the present invention is depicted. The circular plate 19, with the use of the clutch spindles 24, is in mechanical communication with a reverse clutch 63, a low clutch 33, an intermediate clutch 43, an overdrive clutch 53 and a high clutch 70. The reverse clutch 63 transfers power from the turbine shaft 16 to the reverse drive gear shaft 60. The low clutch 33 transfers power from the turbine shaft 16 to the low speed/reverse countershaft 30. The intermediate clutch 43 transfers power from the turbine shaft 16 to the intermediate countershaft 40. The overdrive clutch 53 transfers power from the turbine shaft 16 to the overdrive speed countershaft 50. The high clutch 70 transfers power from the turbine shaft 16 directly to the main shaft 11 for a 1:1 (direct)

drive from turbine shaft 16 to the main shaft 11. A drive coupling 17 is provided for each of the low clutch 33, intermediate clutch 43, overdrive clutch 53, reverse clutch 63, and high clutch 70 for the purposes of mechanical attachment to the circular plate 19.

Figure 3:
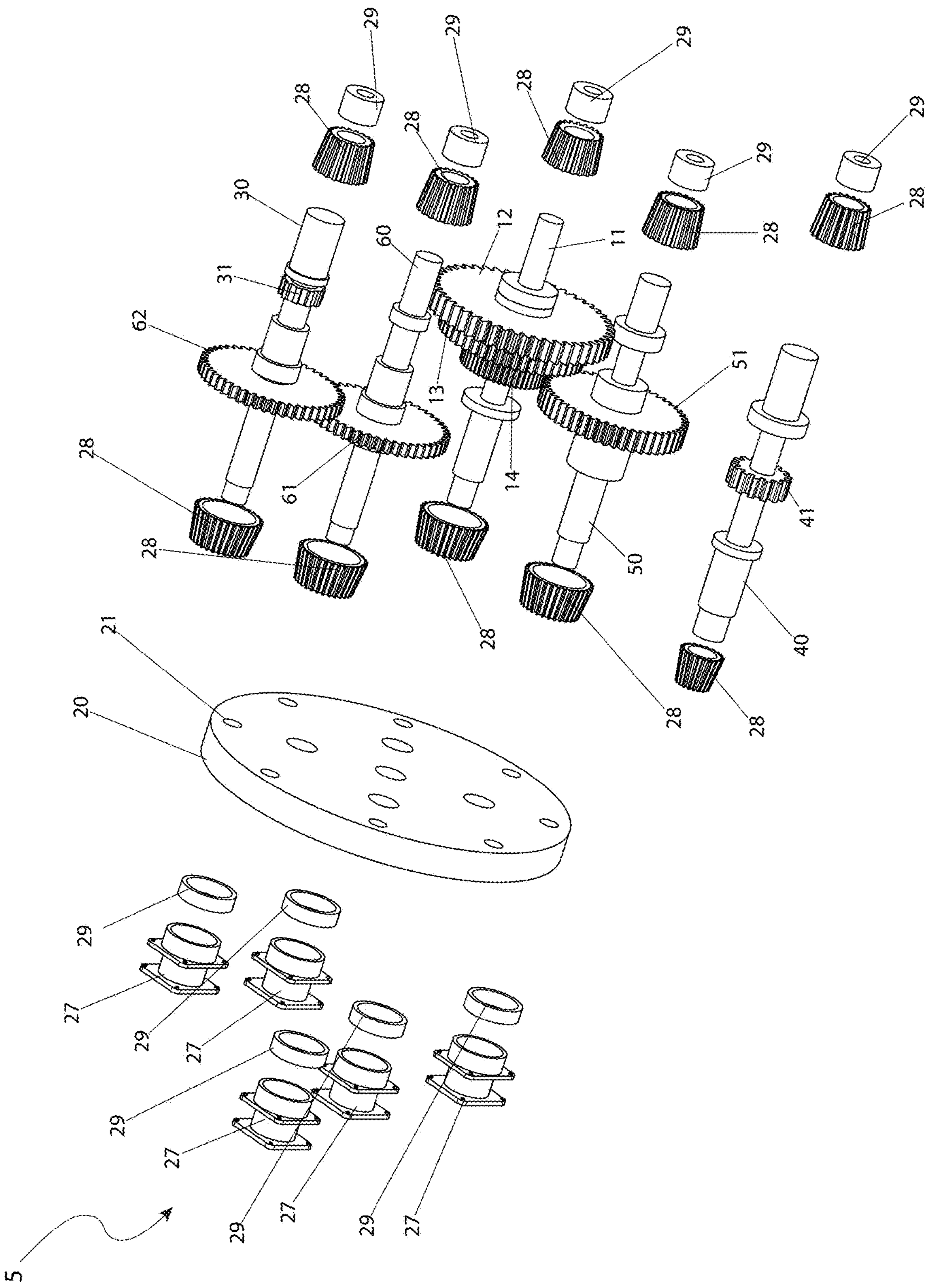
FIG. 3 is an exploded perspective view of a preload plate 20 in relation to various main shaft gears, drive gears, and idler gears associated with the operation of the automatic transmission with enhanced shifting means 5, according to the preferred embodiment of the present invention.

Referring now to FIG. 3, an exploded perspective view of the preload plate 20, in relation to various main shaft gears, drive gears, and idler gears associated with the operation of the automatic transmission with enhanced shifting means 5, according to the preferred embodiment of the present invention is shown. The preload plate 20, provided with multiple preload plate bolt holes 21, supports five (5) different assemblies. A first assembly is a reverse idler gear 62 along with a low-speed countershaft gear 31 and a low speed/reverse countershaft 30. A second assembly is a reverse drive gear 61 along with a reverse drive gear shaft 60. A third assembly is an overdrive speed main shaft gear 14 along with an intermediate speed main shaft gear 13, a low speed main shaft gear 12, and a main shaft 11. A fourth assembly is an overdrive speed countershaft gear 51 along with an overdrive speed countershaft 50. A fifth assembly is an intermediate speed counter shaft gear 41 along with an intermediate countershaft 40. The preload plate 20 supports the front bearings and shafts of the automatic transmission with enhanced shifting means 5 and serves with the preloads caps 27 and shims as the component where adjustments are made to the bearings for proper end play or thrust adjustment. The preload plate bolt hole 21 provides for the attachment of the preload plate 20 to the gears and the shaft housing.

The reverse idler gear 62 transfers power from reverse drive gear 61 to the low speed/reverse countershaft 30. The low-speed countershaft gear 31 transfers power from low speed/reverse countershaft 30 to the low-speed main shaft gear 12. The low speed/reverse countershaft 30 provides power transfer from the low clutch 33 to the low-speed countershaft gear 31 and power from the reverse idler gear 62 to the low-speed countershaft gear 31. The reverse drive gear 61 transfers power to the reverse idler gear 62. The reverse drive gear shaft 60 supports and rotates the reverse drive gear 61. The overdrive speed main shaft gear 14 is used after direct drive speed has increased vehicle speed to the point that the engine can now turn at a slower revolutions per minute and still maintain an efficient road speed to conserve fuel. The intermediate speed main shaft gear 13 provides more rotational speed, at less torque, to increase the speed of the vehicle once it is moving fast enough from the speed and torque that the low-speed main shaft gear 12 that is used in the automatic transmission with enhanced shifting means 5 to provide the greatest torque when equipped vehicle is initially powered to move the vehicle. The main shaft 11 provides for the output of rotation and torque from the automatic transmission with enhanced shifting means 5 to the final drive and differential of the vehicle. The overdrive speed countershaft gear 51 transfers power from the overdrive speed countershaft 50 to the overdrive speed main shaft gear 14. The overdrive speed countershaft 50 transfers power from the overdrive clutch 53 to the overdrive speed countershaft gear 51. The intermediate countershaft 40 transfers power from the intermediate clutch 43 to the intermediate speed counter shaft gear 41. The intermediate speed counter shaft gear 41 transfers power from intermediate countershaft 40 to the intermediate speed main shaft gear 13. A preload cap 27, a bearing cone 28, and a bearing cup 29 are provided for each of the main shaft 11, the low speed/reverse countershaft 30, the intermediate countershaft 40, the overdrive speed countershaft 50, and the reverse drive gear shaft 60 for the purposes of mechanical attachment to the preload plate 20.

Figure 4:
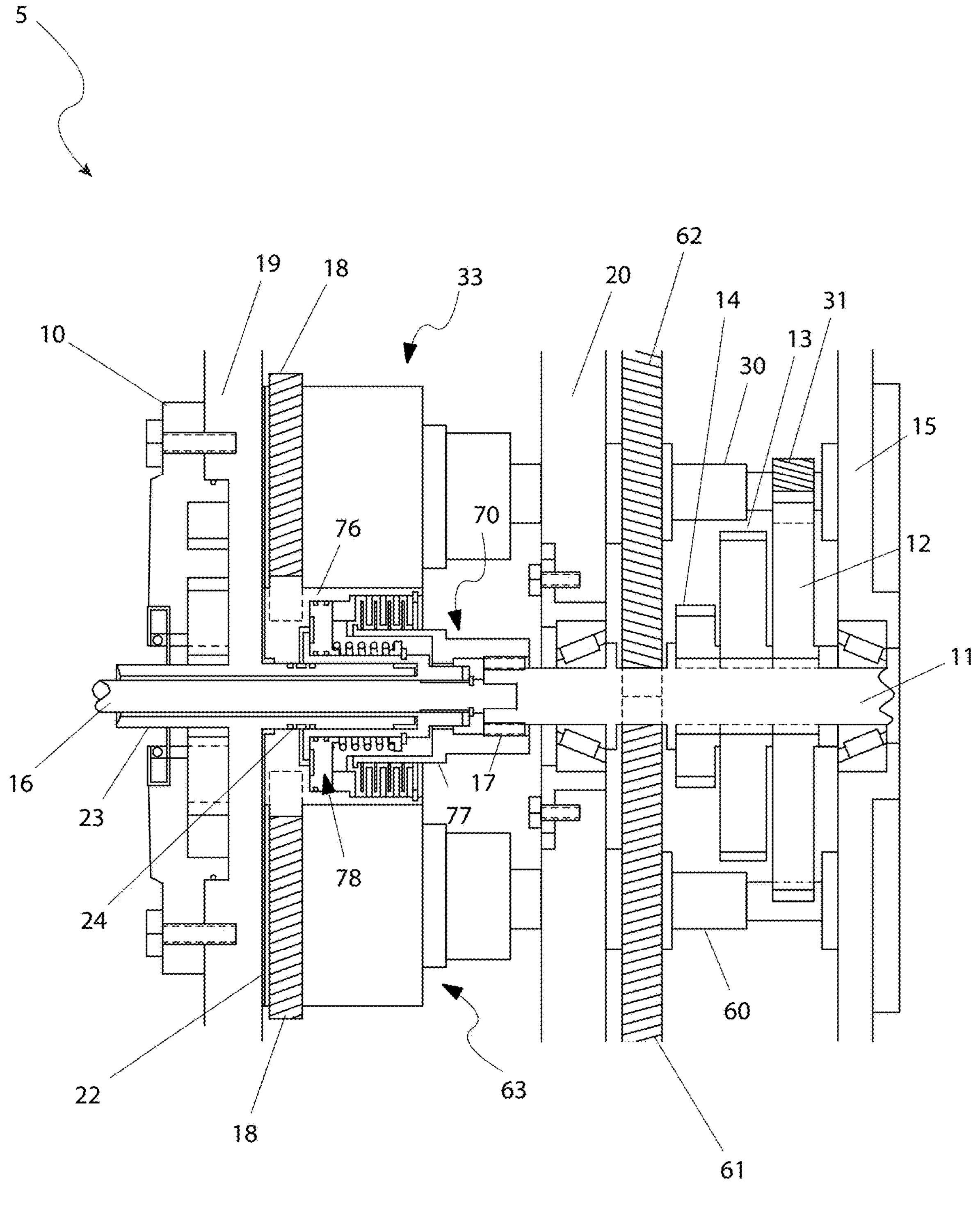
FIG. 4 is a cross-sectional view of the automatic transmission with enhanced shifting means 5, according to the preferred embodiment of the present invention.

Referring next to FIG. 4, a cross-sectional view of the automatic transmission with enhanced shifting means 5, according to the preferred embodiment of the present invention is disclosed. The disclosure clearly depicts the relationship between the circular plate 19 and the preload plate 20. The circular plate 19 supports the hydraulic pump 10, the turbine shaft 16, the stator support 23, and the clutch spindles 24. The low clutch 33, the reverse clutch 63, along with their clutch drum gear 18 are visible. The reverse drive gear shaft 60 and the reverse idler gear 62 along with their respective reverse drive gear 61 and low speed/reverse countershaft 30 are also visible. The hydraulic pump 10 provides for the circulation of the transmission fluid under pressure to operate the clutches torque converter, lubrication of all mechanical and frictional components and transmission oil cooler circulation for fluid cooling during operation of the automatic transmission with enhanced shifting means 5. The turbine shaft 16 is an input component that supplies rotation and torque from the turbine inside the torque converter to the automatic transmission with enhanced shifting means 5. The stator support 23 supports the stator inside the torque converter and is a machined part of the circular plate 19. The clutch spindles 24 are a machined part of the circular plate 19.

The clutch drum gear 18 is machined on each of the five (5) clutch drums (low clutch drum 34, intermediate clutch drum 44, overdrive clutch drum 54, reverse clutch drum 64, and high clutch drum 76) that serve to transfer rotation from the turbine shaft 16 to all of the five (5) clutches (low clutch 33, intermediate clutch 43, overdrive clutch 53, reverse clutch 63, and high clutch 70) at the same time. The high clutch drum 76 transfers power through the driving and driven plates and clutch hub to the main shaft 11, with the gear on the high clutch drum 76 meshing with the other four (4) clutch drum gears to transfer power from turbine shaft 16 to the all of the five (5) clutch drums (low clutch drum 34, intermediate clutch drum 44, overdrive clutch drum 54, reverse clutch drum 64, and high clutch drum 76). The high clutch piston 78 compresses the high clutch plates together to transfer power to the main shaft 11. The low clutch 33 transfers power from the turbine shaft 16 to the low speed/reverse countershaft 30. The high clutch 70 transfers power from the turbine shaft 16 directly to the main shaft 11 for a 1:1 (direct) drive from turbine shaft 16 to the main shaft 11. The high clutch hub 77 transfers power from clutch plates to the main shaft 11. The reverse clutch 63 transfers power from the turbine shaft 16 to the reverse drive gear shaft 60. The preload plate 20 supports the front bearings and shafts of the automatic transmission with enhanced shifting means 5 and with the preload caps 27 and shims serves as the component where adjustments are made to the bearings for proper end play or thrust adjustment. The reverse idler gear 62 transfers power from reverse drive gear 61 to the low speed/reverse countershaft 30. The reverse drive gear 61 transfers power to the reverse idler gear 62. The low speed/reverse countershaft 30 provides power transfer from the low clutch 33 to the low-speed countershaft gear 31 and power from the reverse idler gear 62 to the low-speed countershaft gear 31. The intermediate speed main shaft gear 13 provides more rotational speed, at less torque, to increase the speed of the vehicle once it is moving fast enough from the speed and torque that the low-speed main shaft gear 12 provides. The low-speed countershaft gear 31 transfers power from low speed/reverse countershaft 30 to the low-speed main shaft gear 12. The main shaft 11 provides for the output of rotation and torque from the automatic transmission with enhanced shifting means 5 to the final drive and differential of the vehicle. The low-speed main shaft gear 12 is used in the automatic transmission with enhanced shifting means 5 to provide the greatest torque when equipped vehicle is initially powered to move the vehicle. The rear housing plate 15 supports the rear of the shafts 11, 30, 40, 50, 60, and rear bearings and attaches to the rear of the gears and the shafts housing.

Figure 5:
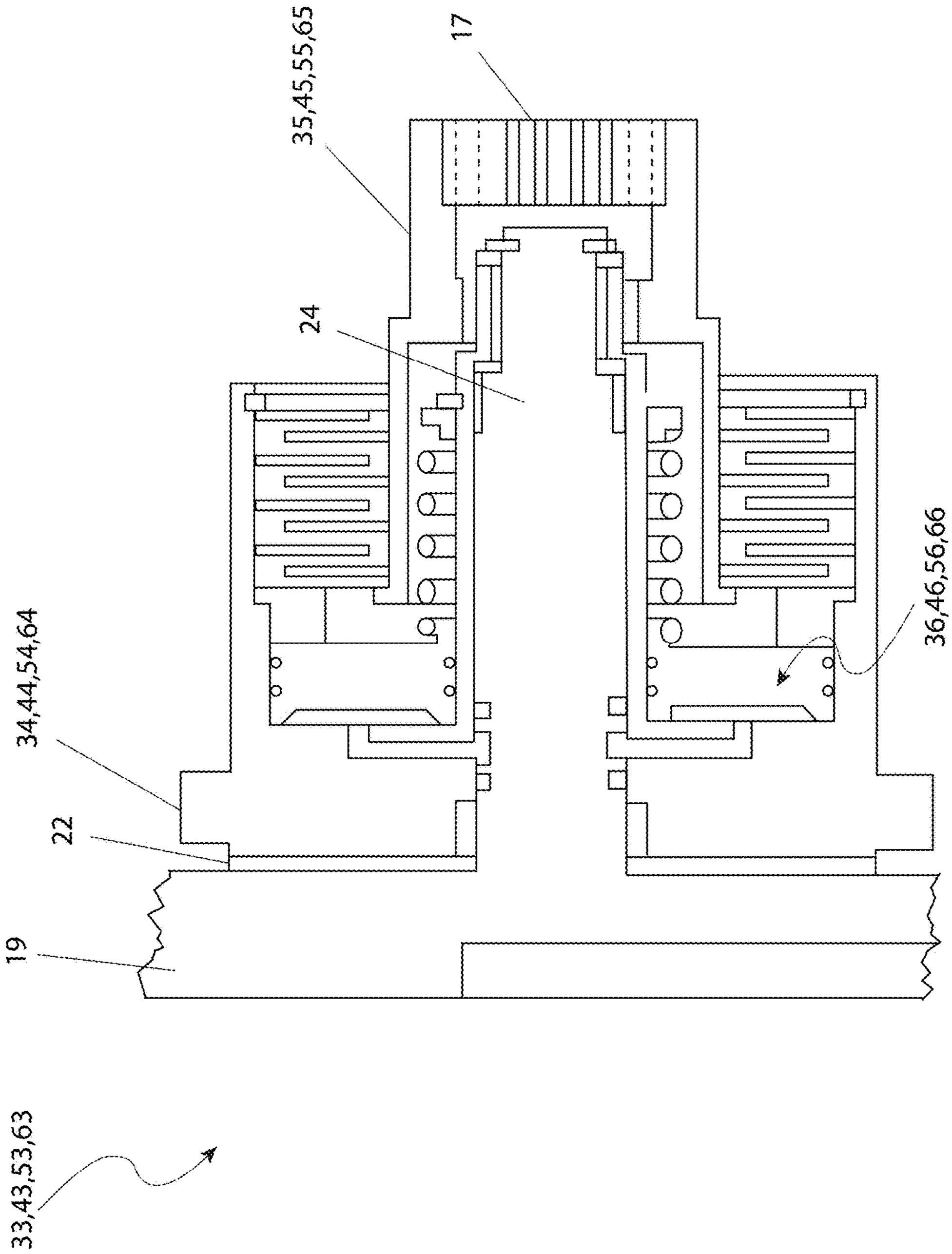
FIG. 5 is a cross-sectional view representing a low clutch 33, a reverse clutch 63, an overdrive clutch 53, and an intermediate clutch 43, as components of the automatic transmission with enhanced shifting means 5, according to the preferred embodiment of the present invention.

Referring now to FIG. 5, a cross-sectional view of the circular plate 19, as a component of the automatic transmission with enhanced shifting means 5, according to the preferred embodiment of the present invention is depicted. This view discloses the physical mechanical arrangement of the low clutch 33, the intermediate clutch 43, the overdrive clutch 53, and the reverse clutch 63. Each of the aforementioned subcomponents include a low clutch drum 34, an intermediate clutch drum 44, an overdrive clutch drum 54, a reverse clutch drum 64, a low clutch hub 35, an intermediate clutch hub 45, an overdrive clutch hub 55, a reverse clutch hub 65, a low clutch piston assembly 36, an intermediate clutch piston assembly 46, an overdrive clutch piston assembly 56 and a reverse clutch piston assembly 66. The low clutch 33 transfers power from the turbine shaft 16 to the low speed/reverse countershaft 30. The intermediate clutch 43 transfers power from the turbine shaft 16 to the intermediate countershaft 40. The overdrive clutch 53 transfers power from the turbine shaft 16 to the overdrive speed countershaft 50. The reverse clutch 63 transfers power from the turbine shaft 16 to the reverse drive gear shaft 60. The low clutch drum 34 transfers power through the driving and driven plates and clutch hub to the low speed/reverse countershaft 30. The intermediate clutch drum 44 transfers power through the driving and driven plates and clutch hub to the intermediate countershaft 40. The overdrive clutch drum 54 transfers power through the driving and driven plates and clutch hub to the overdrive speed countershaft 50. The reverse clutch drum 64 transfers power through the driving and driven plates and clutch hub to the reverse drive gear shaft 60. The low clutch hub 35 transfers power from clutch plates to the low speed/reverse countershaft 30. The intermediate clutch hub 45 transfers power from clutch plates to the intermediate countershaft 40. The overdrive clutch hub 55 transfers power from clutch plates to the overdrive speed countershaft 50. The reverse clutch hub 65 transfers power from clutch plates to the reverse drive gear shaft 60. The low clutch piston assembly 36 compresses the low clutch plates together to transfer power to the low speed/reverse countershaft 30. The intermediate clutch piston assembly 46 compresses intermediate clutch plates together to transfer power to the intermediate countershaft 40. The overdrive clutch piston assembly 56 compresses overdrive clutch plates together to transfer power to the overdrive speed countershaft 50. The reverse clutch piston assembly 66 compresses reverse clutch plates together to transfer power to the reverse drive gear shaft 60.

Figure 6:
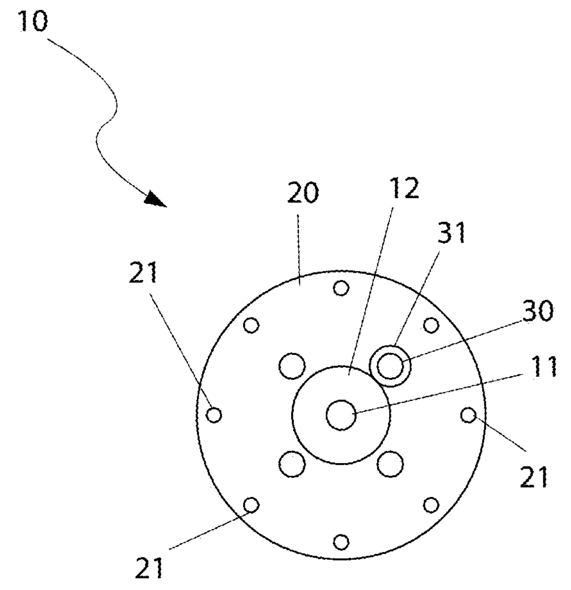
FIG. 6 is a rear view of the preload plate 20 depicting its relationship with a low speed/reverse countershaft 30, as a component of the automatic transmission with enhanced shifting means 5, according to the preferred embodiment of the present invention.

Referring next to FIG. 6, a rear view of the preload plate 20, depicting its relationship with the low speed/reverse countershaft 30, as a component of the automatic transmission with enhanced shifting means 5, according to the preferred embodiment of the present invention is shown. The low-speed countershaft gear 31, along with the low speed/reverse countershaft 30, is arranged tangentially with the main shaft 11 and low speed main shaft gear 12. Multiple preload plate bolt holes 21 are also present. The preload plate 20 supports the front bearings and shafts of the automatic transmission with enhanced shifting means 5 and serves with the preload caps 27 and shims as the component where adjustments are made to the bearings for proper end play or thrust adjustment. The low-speed main shaft gear 12 is used to provide the greatest torque when equipped vehicle is initially powered to move the vehicle. The low-speed countershaft gear 31 transfers power from low speed/reverse countershaft 30 to the low-speed main shaft gear 12. The low speed/reverse countershaft 30 provides power transfer from the low clutch 33 to the low-speed countershaft gear 31 and power from the reverse idler gear 62 to the low-speed countershaft gear 31. The main shaft 11 provides for the output of rotation and torque from the automatic transmission with enhanced shifting means 5 to the final drive and differential of the vehicle. The preload plate bolt holes 21 are provided for the attachment of the preload plate 20 to the gears and shafts housing.

Figure 7:
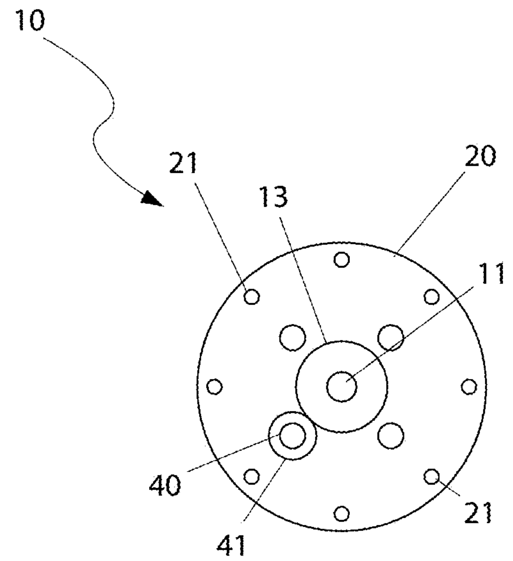
FIG. 7 is a rear view of the preload plate 20 depicting its relationship with an intermediate countershaft 40, as a component of the automatic transmission with enhanced shifting means 5, according to the preferred embodiment of the present invention.

Referring now to FIG. 7, a rear view of the preload plate 20, depicting its relationship with the intermediate countershaft 40, as a component of the automatic transmission with enhanced shifting means 5, according to the preferred embodiment of the present invention is disclosed. The intermediate speed counter shaft gear 41, along with the intermediate countershaft 40, is arranged tangentially with the main shaft 11 and intermediate speed main shaft gear 13. Multiple preload plate bolt holes 21 are also present. The preload plate 20 supports the front bearings and shafts of the automatic transmission with enhanced shifting means 5 and serves with the preload caps 27 and shims as the component where adjustments are made to the bearings for proper end play or thrust adjustment. The intermediate speed main shaft gear 13 provides more rotational speed, at less torque, to increase the speed of the vehicle once it is moving fast enough from the speed and torque that the low-speed main shaft gear 12 provides. The intermediate countershaft 40 transfers power from the intermediate clutch 43 to the intermediate speed counter shaft gear 41. The intermediate speed counter shaft gear 41 transfers power from intermediate countershaft 40 to the intermediate speed main shaft gear 13. The main shaft 11 provides for the output of rotation and torque from the automatic transmission with enhanced shifting means 5 to the final drive and differential of the vehicle. The preload plate bolt holes 21 provide for the attachment of the preload plate 20 to the gears and shafts housing.

Figure 8:
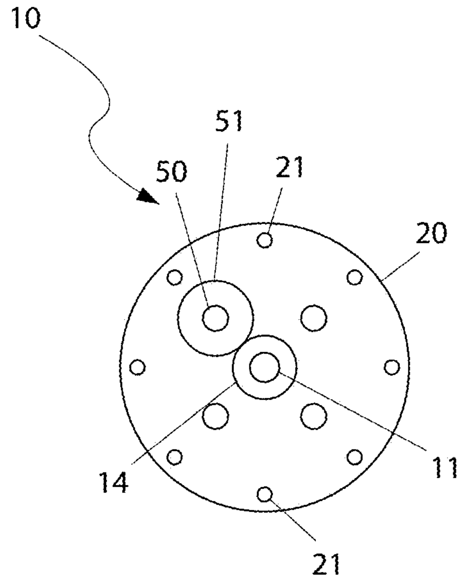
FIG. 8 is a rear view of the preload plate 20 depicting its relationship with an overdrive speed countershaft 50, as a component of the automatic transmission with enhanced shifting means 5, according to the preferred embodiment of the present invention.

Referring next to FIG. 8, a rear view of the preload plate 20, depicting its relationship with the overdrive speed countershaft 50, as a component of the automatic transmission with enhanced shifting means 5, according to the preferred embodiment of the present invention is depicted. The overdrive speed countershaft 50, along with the overdrive speed countershaft gear 51, is arranged tangentially with the main shaft 11 and overdrive speed main shaft gear 14. Multiple preload plate bolt holes 21 are also present. The preload plate 20 supports the front bearings and shafts of the automatic transmission with enhanced shifting means 5 and serves with the preload caps 27 and shims as the component where adjustments are made to the bearings for proper end play or thrust adjustment. The overdrive speed countershaft gear 51 transfers power from the overdrive speed countershaft 50 to the overdrive speed main shaft gear 14. The overdrive speed countershaft 50 transfers power from the overdrive clutch 53 to the overdrive speed countershaft gear 51. The main shaft 11 provides for the output of rotation and torque from the automatic transmission with enhanced shifting means 5 to the final drive and differential of the vehicle. The overdrive speed main shaft gear 14 is used after direct drive speed has increased vehicle speed to the point that the engine can now turn at a slower RPM and still maintain an efficient road speed to conserve fuel. The preload plate bolt holes 21 provide for the attachment of the preload plate 20 to the gears and shafts housing.

Figure 9:
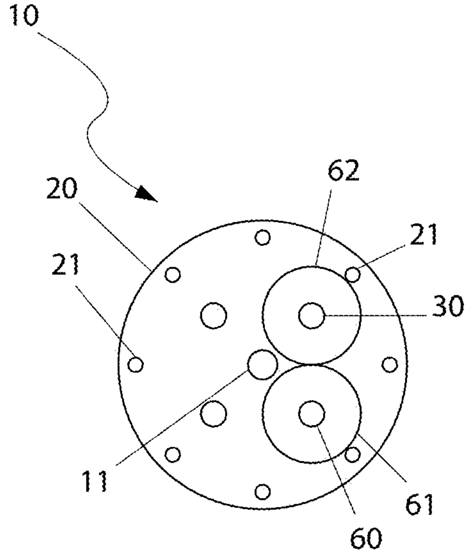
FIG. 9 is a rear view of the preload plate 20 depicting its relationship with a reverse drive gear shaft 60 and a reverse idler gear 62, as a component of the automatic transmission with enhanced shifting means 5, according to the preferred embodiment of the present invention.

Referring now to FIG. 9, a rear view of the preload plate 20, depicting its relationship with the reverse drive gear shaft 60 and reverse idler gear 62, as a component of the automatic transmission with enhanced shifting means 5, according to the preferred embodiment of the present invention is shown. The reverse drive gear shaft 60 and reverse idler gear 62, along with their respective reverse drive gear 61 and low speed/reverse countershaft 30, are arranged tangentially with the main shaft 11. Multiple preload plate bolt holes 21 are also present. The preload plate 20 supports the front bearings and shafts of the automatic transmission with enhanced shifting means 5 and serves with the preload caps 27 and shims as the component where adjustments are made to the bearings for proper end play or thrust adjustment. The main shaft 11 provides for the output of rotation and torque from the automatic transmission with enhanced shifting means 5 to the final drive and differential of the vehicle. The preload plate bolt holes 21 provide for the attachment of the preload plate 20 to the gears and shafts housing. The reverse drive gear shaft 60 supports and rotates the reverse drive gear 61. The reverse drive gear 61 transfers power to the reverse idler gear 62. The reverse idler gear 62 transfers power from reverse drive gear 61 to the low speed/reverse countershaft 30. The low speed/reverse countershaft 30 provides power transfer from the low clutch 33 to the low-speed countershaft gear 31 and power from the reverse idler gear 62 to the low-speed countershaft gear 31.

Figure 10:
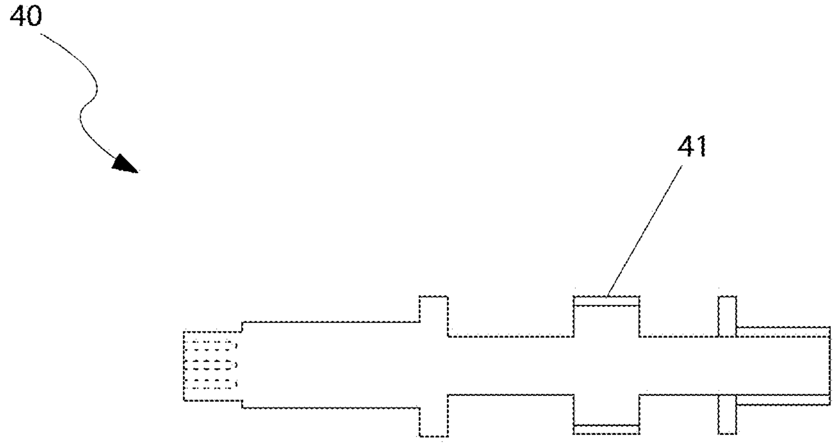
FIG. 10 is a cross-sectional view of the intermediate countershaft 40, as a component of the automatic transmission with enhanced shifting means 5, according to the preferred embodiment of the present invention.

Referring next to FIG. 10, a cross-sectional view of the intermediate countershaft 40, as a component of the automatic transmission with enhanced shifting means 5, according to the preferred embodiment of the present invention is disclosed. This arrangement discloses the respective intermediate speed counter shaft gear 41 of the intermediate countershaft 40. The intermediate countershaft 40 transfers power from the intermediate clutch 43 to the intermediate speed counter shaft gear 41. The intermediate speed counter shaft gear 41 transfers power from intermediate countershaft 40 to the intermediate speed main shaft gear 13.

Figure 11:
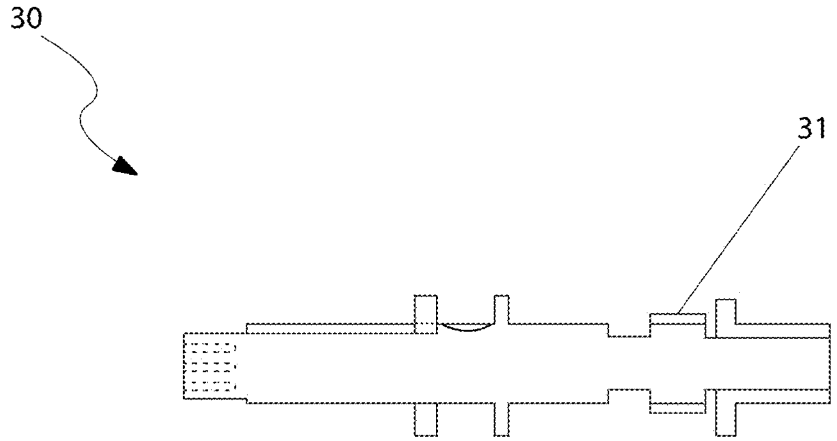
FIG. 11 is a cross-sectional view of the low speed/reverse countershaft 30, as a component of the automatic transmission with enhanced shifting means 5, according to the preferred embodiment of the present invention.

Referring now to FIG. 11, a cross-sectional view of the low speed/reverse countershaft 30, as a component of the automatic transmission with enhanced shifting means 5, according to the preferred embodiment of the present invention is depicted. This arrangement discloses the respective low speed countershaft gear 31 of the low speed/reverse countershaft 30. The low speed/reverse countershaft 30 provides power transfer from the low clutch 33 to the low-speed countershaft gear 31 and power from the reverse idler gear 62 to the low-speed countershaft gear 31. The low-speed countershaft gear 31 transfers power from low speed/reverse countershaft 30 to the low-speed main shaft gear 12.

Figure 12:
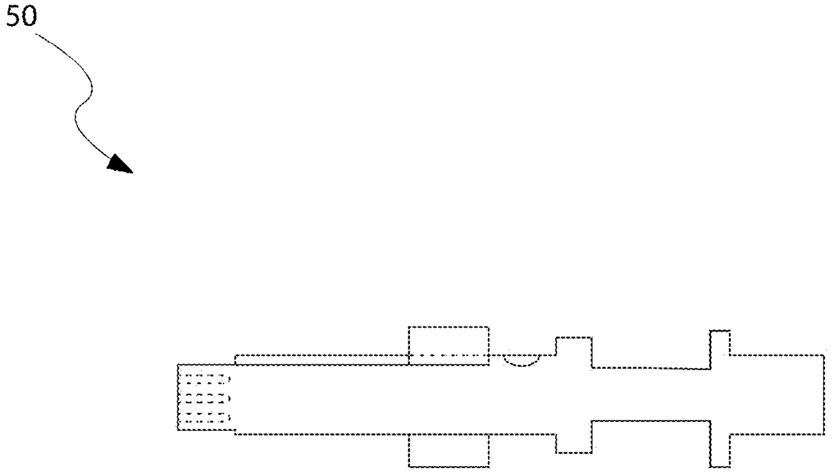
FIG. 12 is a cross-sectional view of the overdrive speed countershaft 50, as a component of the automatic transmission with enhanced shifting means 5, according to the preferred embodiment of the present invention.

Referring next to FIG. 12, a cross-sectional view of the overdrive speed countershaft 50, as a component of the automatic transmission with enhanced shifting means 5, according to the preferred embodiment of the present invention is shown.

Figure 13:
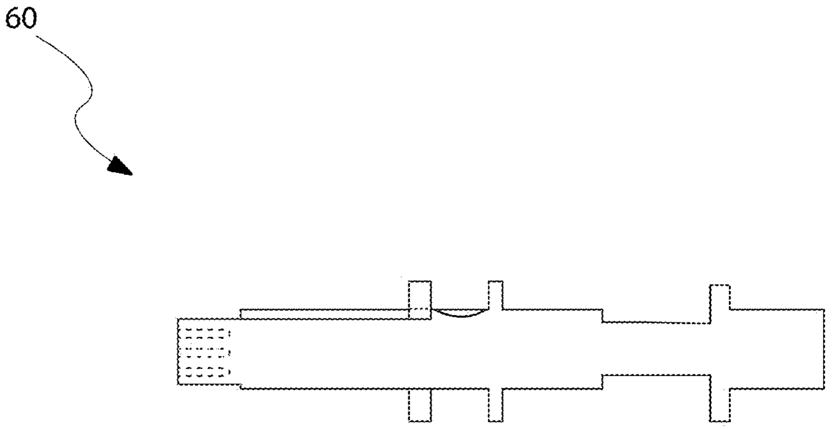
FIG. 13 is a cross-sectional view of the reverse drive gear shaft 60, as a component of the automatic transmission with enhanced shifting means 5, according to the preferred embodiment of the present invention.

Referring now to FIG. 13, a cross-sectional view of the reverse drive gear shaft 60, as a component of the automatic transmission with enhanced shifting means 5, according to the preferred embodiment of the present invention is disclosed.

Figure 14:
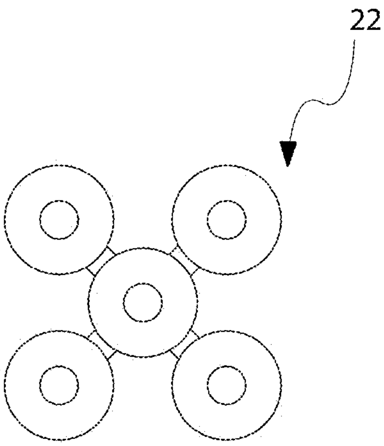
FIG. 14 is a rear view of a thrust washer 22, as a component of the automatic transmission with enhanced shifting means 5, according to the preferred embodiment of the present invention; and, FIG. 15 is a rear view of the circular plate 19, as a component of the automatic transmission with enhanced shifting means 5, according to the preferred embodiment of the present invention.
Figure 15:
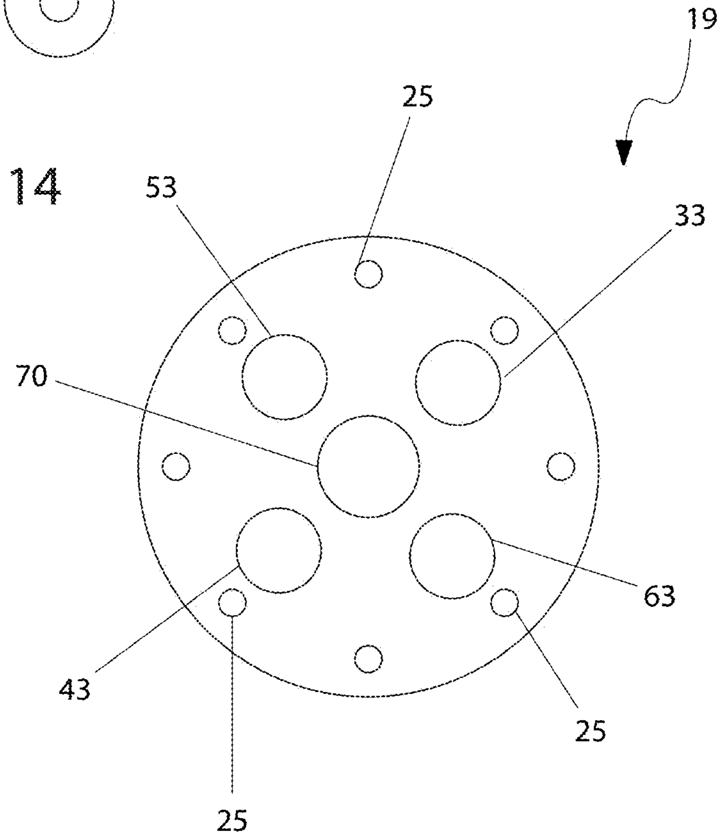

Referring to FIGS. 14 and 15, rear views of the circular plate 19 and the thrust washer 22, as components of the automatic transmission with enhanced shifting means 5, according to the preferred embodiment of the present invention is depicted. The circular plate 19 discloses the circular arrangement of the intermediate clutch 43, the overdrive clutch 53, the low clutch 33 and the reverse clutch 63 around the high clutch 70. Thrust control is provided by the thrust washer 22. Multiple bolt holes 25 are also depicted. The circular plate 19 supports the five (5) clutches (low clutch 33, intermediate clutch 43, overdrive clutch 53, reverse clutch 63, and high clutch 70) and the hydraulic pump 10 so that the turbine shaft 16 running through the center of the circular plate 19 transfers power via the high clutch drum 76 to the other four clutch drums ((low clutch drum 34, intermediate clutch drum 44, overdrive clutch drum 54, and reverse clutch drum 64). The thrust washer 22 adjusts for end play or thrust for the clutch drums (low clutch drum 34, intermediate clutch drum 44, overdrive clutch drum 54, reverse clutch drum 64, and high clutch drum 76). The bolt holes 25, total of eight (8), are drilled and counterbored during the manufacture of the circular plate 19 provides for the attachment of the circular plate 19 to the clutch housing using fasteners. The low clutch 33 transfers power from the turbine shaft 16 to the low speed/reverse countershaft 30. The intermediate clutch 43 transfers power from the turbine shaft 16 to the intermediate countershaft 40. The overdrive clutch 53 transfers power from the turbine shaft 16 to the overdrive speed countershaft 50. The reverse clutch 63 transfers power from the turbine shaft 16 to the reverse drive gear shaft 60. The high clutch 70 transfers power from the turbine shaft 16 directly to the main shaft 11 for a 1:1 (direct) drive from turbine shaft 16 to the main shaft 11.

In an additional embodiment, the automatic transmission with enhanced shifting means 5 consists of all of the numbered components described in the foregoing specification. Specifically, the transmission consists of: a hydraulic pump 10; a main shaft 11; a low speed main shaft gear 12; an intermediate speed main shaft gear 13; an overdrive speed main shaft gear 14; a rear housing plate 15; a turbine shaft 16; a drive coupling 17; a clutch drum gear 18; a circular plate 19; a preload plate 20; preload plate bolt holes 21; a thrust washer 22; a stator support 23; clutch spindles 24; bolt holes 25; perimeter holes 26; a preload cap 27; a bearing cone 28; a bearing cup 29; a low speed/reverse countershaft 30; a low speed countershaft gear 31; a low clutch 33; a low clutch drum 34; a low clutch hub 35; a low clutch piston assembly 36; an intermediate countershaft 40; an intermediate speed counter shaft gear 41; an intermediate clutch 43; an intermediate clutch drum 44; an intermediate clutch hub 45; an intermediate clutch piston assembly 46; an overdrive speed countershaft 50; an overdrive speed countershaft gear 51; an overdrive clutch 53; an overdrive clutch drum 54; an overdrive clutch hub 55; an overdrive clutch piston assembly 56; a reverse drive gear shaft 60; a reverse drive gear 61; a reverse idler gear 62; a reverse clutch 63; a reverse clutch drum 64; a reverse clutch hub 65; a reverse clutch piston assembly 66; a high clutch 70; a high clutch drum 76; a high clutch hub 77; and a high clutch piston 78. This embodiment is limited to and includes only the above-recited elements in combination, forming a complete and operable automatic transmission with enhanced shifting means as described herein.

2. OPERATION OF THE PREFERRED EMBODIMENT

The preferred embodiment of the present invention can be utilized by the common user in a simple and effortless manner with little or no training. It is envisioned that the automatic transmission with enhanced shifting means 5 would be constructed in general accordance with FIG. 1 through FIG. 14. The user would procure the automatic transmission with enhanced shifting means 5 from conventional procurement channels such as wholesale mechanical distributors, original equipment manufacturers (OEM's), aftermarket manufacturers, and the like. Special attention would be paid to the overall physical size of the automatic transmission with enhanced shifting means 5, as well as operational specifications including but not limited to horsepower rating, gear ratios, maximum input and output loadings and the like.

After procurement and prior to utilization, the automatic transmission with enhanced shifting means 5 would be installed as part of a drive train between a prime mover and a drive train. Applications include but are not limited to motor vehicles, trains, busses, construction equipment, stationary mechanical equipment and the like. Once installed, operation of the automatic transmission with enhanced shifting means 5 would be transparent to the typical user when compared to a conventional automatic transmission.

During utilization of the automatic transmission with enhanced shifting means 5, the following procedure would be initiated: As a general example, assuming the automatic transmission with enhanced shifting means 5 is installed in a motor vehicle, usage would be no different than compared to a standard automatic transmission, as there is no clutch or clutch pedal. The selector lever positions, ("P"-"R"-"N"-"D"-"L" or similar indications) would be the same. The operator would place the selector lever in the desired position for operation, ("P"—park, "R"—reverse, "N"—neutral, "D"—drive, "L"—low). The drive position would shift the automatic transmission with enhanced shifting means 5 in succession from low gear, intermediate gear, high gear and overdrive gear. The "L" position would hold the transmission in low gear. Neutral would disengage the automatic transmission with enhanced shifting means 5 from the engine (vehicle would still be able to roll). Reverse would move the vehicle backwards. Park would place the automatic transmission with enhanced shifting means 5 in neutral and lock the vehicle from rolling.

The automatic transmission with enhanced shifting means 5 matches engine output to road conditions, by taking gear ratios inside the automatic transmission with enhanced shifting means 5 and applying them to the transmission output shaft by coupling the ratios to the engine through clutches 33, 43, 53, 63, 70. All gears 12, 13, 14, 18, 31, 41, 51, 61, 62 (including reverse) are in constant mesh. There is no shifting of synchronizers, no locking of one (1) component and shifting input and output power through the other two (2) components, (as in a planetary gearset). All gears 12, 13, 14, 18, 31, 41, 51, 61, 62 are coupled to the clutches 33, 43, 53, 63, 70 and are constantly rotating at their respective speeds determined by their ratios through the fixed gears on the output shaft that downshifting would also be smoother. There are also no planetary gears, servos, or brake bands. The arrangement of the automatic transmission with enhanced shifting means 5 is similar to a standard transmission in that there is a main shaft 11, main shaft gears 12, 13, 14, countershaft gears 31, 41, 51 and countershafts 30, 40, 50. The main shaft 11 and three (3) gears 12, 13, 14 are solidly connected to it is in the center of the housing. Surrounding the main shaft 11 are three (3) countershafts 30, 40, 50 and a reverse drive gear shaft 60. Three (3) of the countershafts 30, 40, 50 have a gear 31, 41, 51 attached to them that meshes with one (1) of the gears 12, 13, 14 on the main shaft 11. These countershaft gears 31, 41, 51 and their associated main shaft gears 12, 13, 14 provide first, second and overdrive speeds. The high speed is a direct coupling of the main shaft 11 to the input shaft. The reverse drive gear shaft 60 has a reverse drive gear 61 that meshes with a reverse idler gear 62 on the low speed/reverse countershaft. Reverse uses these two (2) gears along with the low speed countershaft gear 30 and low speed main shaft gear 12. All of the gears 12, 13, 14, 18, 31, 41, 51, 61, 62 associated with the automatic transmission with enhanced shifting means 5 are in constant mesh and constantly rotating when the automatic transmission with enhanced shifting means 5 is in operation. The speeds are accomplished by coupling each gear and countershaft combination through a multi-plate clutch. As the shift sequence progresses, the previous countershaft and gear combination is uncoupled by its clutch in order to allow the next clutch in the sequence to connect power to its respective countershaft and gear.

It is also envisioned that the automatic transmission with enhanced shifting means 5 can be arranged in a modular configuration to facilitate manufacture and repair. The first or front section would be the torque converter. The next or second section would be the clutches 33, 43, 53, 63, 70 and their associated parts. Next or third, would be the gear and shaft section. Finally, and last would be the extension housing and its associated parts. If one (1) section needs repair, the remaining sections can remain assembled. Actuation of the automatic transmission with enhanced shifting means 5 can be accomplished in a wide variety of manner including hydraulic, air, or electric actuation. The shift control could be electronic, hydraulic, or a combination of the two (2). As such, the method of activation and shift control shall not be interpreted as a limiting factor of the present invention.

Multiple adaptations of the automatic transmission with enhanced shifting means 5 would be ideally suited for racing applications which would also allow for switching between manual and automatic operation of the automatic transmission with enhanced shifting means 5.

The features of the automatic transmission with enhanced shifting means 5 are envisioned to provide the following benefits: a completely automatic transmission without the need for the user to initiate gear ratio changes, a simple design, a lack of planetary gears, a smoother shifting, a lesser amount of parts resulting in lower overall cost, a reduced complication when constructing and a reduced complication when repairing, and a better drivability.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An automatic transmission with enhanced shifting means, comprising:

a hydraulic pump having perimeter holes;

a circular plate having bolt holes and being mechanically connected to the hydraulic pump via the perimeter holes;

a turbine shaft passing through the circular plate;

a plurality of clutch spindles supported by the circular plate;

a thrust washer supported by the circular plate;

a plurality of clutches including a reverse clutch, a low clutch, an intermediate clutch, an overdrive clutch, and a high clutch, each clutch mounted to a respective clutch spindle and coupled to the turbine shaft;

a preload plate having multiple preload-plate bolt holes;

a plurality of gears and shafts supported by the preload plate, said gears and shafts comprising a reverse idler gear, a low-speed countershaft gear, a low-speed/reverse countershaft, a reverse drive gear, a reverse drive gear shaft, an overdrive-speed main shaft gear, an intermediate-speed main shaft gear, a low-speed main shaft gear, a main shaft, an overdrive-speed countershaft gear, an overdrive-speed countershaft, an intermediate-speed counter-shaft gear, and an intermediate countershaft;

a preload cap, a bearing cone, and a bearing cup associated with each of the main shaft, the low speed/reverse countershaft, the intermediate countershaft, the overdrive-speed countershaft, and the reverse drive gear shaft;

a stator support formed as part of the circular plate; and, wherein the circular plate supports the hydraulic pump and the plurality of clutches such that the turbine shaft transfers power via a high clutch drum to other clutch drums, and wherein the preload plate supports front bearings and shafts and is configured to adjust bearing end play or thrust using the preload cap, bearing cone, and bearing cup.

2. The automatic transmission of claim 1, wherein the hydraulic pump circulates transmission fluid under pressure to operate the clutches, a torque converter, lubricate mechanical and frictional components, and provide transmission fluid cooling.

3. The automatic transmission of claim 1, wherein the circular plate includes eight bolt holes and perimeter holes, the bolt holes being counterbored for attachment of the circular plate to a clutch housing via fasteners, and wherein the perimeter holes align with the perimeter holes of the hydraulic pump.

4. The automatic transmission of claim 1, wherein the plurality of clutches are arranged circumferentially around the circular plate with the high clutch disposed centrally, and wherein each of the reverse clutch, the low clutch, the intermediate clutch, and the overdrive clutch is coupled to the high clutch drum through clutch drum gears machined on each clutch drum.

5. The automatic transmission of claim 1, wherein the preload plate supports the reverse idler gear in meshing engagement with the reverse drive gear and the low-speed/reverse countershaft, the reverse idler gear being configured to transfer power from the reverse drive gear to the low-speed countershaft gear.

6. The automatic transmission of claim 1, wherein each of the reverse clutch, the low clutch, the intermediate clutch, the overdrive clutch, and the high clutch comprises a clutch drum, a clutch hub, and a clutch piston assembly, the clutch piston assembly being configured to compress clutch plates to transfer power to the respective shaft.

7. The automatic transmission of claim 1, wherein the stator support formed as part of the circular plate is configured to support a stator within a torque converter, and wherein the turbine shaft supplies rotation and torque from a turbine inside the torque converter to the automatic transmission.

8. The automatic transmission of claim 1, wherein the main shaft is solidly connected to the low-speed main shaft gear, the intermediate-speed main shaft gear, and the overdrive-speed main shaft gear and is surrounded by the low-speed/reverse countershaft, the intermediate countershaft, the overdrive-speed countershaft, and the reverse drive gear shaft, and wherein each countershaft gear meshes with a corresponding main shaft gear to provide multiple forward speeds and a reverse speed.

9. The automatic transmission of claim 1, wherein said plurality of gears supported by the preload plate are in constant mesh and are coupled to the plurality of clutches so that gear changes are accomplished by selectively engaging or disengaging the clutches without shifting synchronizers or planetary gear sets.

* * * * *